US012308535B2

(12) United States Patent
Karilainen

(10) Patent No.: US 12,308,535 B2
(45) Date of Patent: May 20, 2025

(54) CIRCULARLY POLARIZED ANTENNAS

(71) Applicant: COREHW SEMICONDUCTOR OY, Tampere (FI)

(72) Inventor: Antti Karilainen, Tampere (FI)

(73) Assignee: COREHW SEMICONDUCTOR OY, Tampere (FI)

( * ) Notice: Subject to any disclaimer, the term of this patent is extended or adjusted under 35 U.S.C. 154(b) by 193 days.

(21) Appl. No.: 18/254,473

(22) PCT Filed: Nov. 26, 2021

(86) PCT No.: PCT/FI2021/050813
§ 371 (c)(1),
(2) Date: May 25, 2023

(87) PCT Pub. No.: WO2022/117915
PCT Pub. Date: Jun. 9, 2022

(65) Prior Publication Data
US 2023/0420856 A1 Dec. 28, 2023

(30) Foreign Application Priority Data
Dec. 4, 2020 (FI) ..................................... 20206255

(51) Int. Cl.
*H01Q 9/04* (2006.01)
*H01Q 1/36* (2006.01)
*H01Q 9/28* (2006.01)

(52) U.S. Cl.
CPC ............... *H01Q 9/285* (2013.01); *H01Q 1/36* (2013.01)

(58) Field of Classification Search
CPC .... H01Q 9/285; H01Q 9/0428; H01Q 9/0435; H01Q 1/36; H01Q 1/38; H01Q 5/28; H01Q 21/24
See application file for complete search history.

(56) References Cited

U.S. PATENT DOCUMENTS 8,537,063 B2 * 9/2013 Lindenmeier ............ H01Q 9/36 343/866
2002/0126049 A1 9/2002 Okabe et al.
(Continued)

FOREIGN PATENT DOCUMENTS

CN 105846075 A 8/2016
CN 206040960 U 3/2017
(Continued)

OTHER PUBLICATIONS

Wu Dan et al: "Compact and Low-Profile Omnidirectional Circularly Polarized Antenna With Four Coupling Arcs for UAV Applications", IEEE Antennas and Wireless Propagation Letters, vol. 16, Sep. 14, 2017 (Sep. 14, 2017), pp. 2919-2922, XP011672450, ISSN: 1536-1225, DOI: 10.1109/LAWP.2017.2752358 [retrieved on Oct. 27, 2017].
(Continued)

*Primary Examiner* — Awat M Salih
(74) *Attorney, Agent, or Firm* — Robert P. Michal, Esq.; Carter, DeLuca & Farrell LLP

(57) ABSTRACT

A circularly polarized antenna includes a finite, conducting base plate defining a base plane, and an S-shaped top part defining a top plane parallel to the base plane, wherein the top plane has a non-zero distance from the base plane, and wherein both ends of the S-shaped top part have an end contact coupled either to the base plate or to an antenna feed. The antenna is configured to be fed single-ended or differentially to produce at least one pair of co-aligned electric and magnetic dipoles.

13 Claims, 6 Drawing Sheets

(56) References Cited

U.S. PATENT DOCUMENTS

| | | | |
|---|---|---|---|
| 2004/0090371 A1 | 5/2004 | Rossman | |
| 2009/0002254 A1 | 1/2009 | Dumon et al. | |
| 2015/0155630 A1 * | 6/2015 | Jiang | H01Q 9/0464 343/700 MS |
| 2020/0220264 A1 | 7/2020 | Montgomery | |

FOREIGN PATENT DOCUMENTS

| | | | |
|---|---|---|---|
| CN | 108306113 | A | 7/2018 |
| CN | 109378577 | A | 2/2019 |
| CN | 111697329 | A | 9/2020 |
| KR | 20110023618 | A | 3/2011 |

OTHER PUBLICATIONS

Lin Wei et al: "28 GHz Compact Omnidirectional Circularly Polarized Antenna for Device-to-Device Communications in the Future 5G Systems", IEEE Transactions on Antennas and Propagation, IEEE, USA, vol. 65, No. 12, Oct. 5, 2017 (Oct. 5, 2017), pp. 6904-6914, XP011673500, ISSN: 0018-926X, DOI: 10.1109/ TAP. 2017.2759899 [retrieved on Nov. 28, 2017].

International Search Report issued by the European Patent Office acting as the International Searching Authority in relation to International Application No. PCT/FI2021/050813 dated Feb. 16, 2022 (4 pages).

Written Opinion of the International Searching Authority issued by the European Patent Office acting as the International Searching Authority in relation to International Application No. PCT/FI2021/050813 dated Feb. 16, 2022 (8 pages).

International Preliminary Report on Patentability ssued by the European Patent Office acting as the International Preliminary Report on Patentability in relation to International Application No. PCT/FI2021/050813 dated Feb. 15, 2023 (10 pages).

Finnish Search Report issued by the Finnish Patent and Registration Office in relation to Finnish Application No. 20206255 dated Sep. 29, 2021 (2 pages).

Finnish Office Action issued by the Finnish Patent and Registration Office in relation to Finnish Application No. 20206255 dated Sep. 29, 2021 (5 pages).

* cited by examiner

CIRCULARLY POLARIZED ANTENNAS

CROSS-REFERENCE TO RELATED APPLICATIONS

This application is a national phase entry under 35 U.S.C. 371 of PCT International Application No. PCT/FI2021/050813 filed Nov. 26, 2021, which claims priority Finnish Patent Application No. 20206255, filed Dec. 4, 2020, the disclosure of each of these applications is expressly incorporated herein by reference in their entirety.

FIELD

The present invention relates to antennas. More particularly, the invention relates to small circularly polarized dipole and Huygens antennas suitable for applications such as Bluetooth low energy (BLE) direction-finding (DF), global navigation satellite systems (GNSS) and internet-of-things (IoT) devices.

BACKGROUND

Small antenna is used in the art to refer to an electrically small or electrically short antenna, in which the antenna is much shorter than wavelength of the signal it is intended to transmit or receive.

As known in the art, an antenna with length 2 h is electrically short when $2\pi h/\lambda<<1$, where $\lambda$ represents free space wavelength. Alternatively, antenna may be referred to as a small antenna when its largest dimension is less than $\lambda/\pi\approx0.32\lambda$.

Radio systems with circularly polarized (CP) antennas are immune to rotation of transmitting and receiving antennas about the radio signal direction. For example, CP radio systems enable reliable space-to-Earth communication, despite of random rotation of the radio waves in Earth's ionosphere. CP radio systems are also tolerant to odd number of reflections from ground, walls and other obstacles. As known in the art, reflection of circularly or elliptically polarized radio wave changes its handedness, thus creating large polarization mismatch in the receiving antenna, and the received power is in general significantly reduced. Tolerance to reflections is beneficial in direction finding (DF) applications where correct signal direction is desired. Received power is zero for exact opposite-handed circular polarization of the received signal if signal's polarization ellipse and antenna's polarization vectors are circles. Received power is also zero if signal's polarization is elliptical and the polarization ellipse and the antenna polarization vector are opposite-handed ellipses with orthogonal main axes.

The simplest antenna with ideal CP in all directions has co-aligned electrically short electric and magnetic dipoles with equal radiated power from each and 90-degree phase shift between these two dipoles. This combination produces an omnidirectional radiation pattern, and the polarization is circular in all directions. Handedness is determined by the phase shift, which may be either +90 degrees or −90 degrees.

Traditionally, such combination is known as the electrically small helical antenna, which is formed by a wire dipole and loop. If the wire dipole and loop share the same wire and the current is resonant near the first mode, the phase-shift of the electric and magnetic dipoles is automatically 90 degrees. By designing the dimensions such that the radiated power from the straight and loop components are the same and the orientation of the radiated field is the same, the results is close to the simplest CP dipole antenna. The helical antenna can be extended to multi-filar helical antenna for smaller size, lower Q, and better polarization purity.

However, such helical antennas are not suitable to be integrated into small electronic devices needed for Bluetooth low energy (BLE) direction-finding (DF), global navigation satellite systems (GNSS) and internet-of-things (IoT) application, as they are not tolerant to nearby components, printed circuit boards (PCBs), etc., in terms of polarization purity.

A simple unidirectional CP antenna is the so-called Huygens antenna that can be understood with two crossed electric and magnetic dipoles. Crossed electric and magnetic dipoles with the same phase create a unidirectional linearly-polarized (LP) antenna (also known as "Green's antenna" or "P×M antenna"), and by combining two of these antenna that are rotated by 90 degrees about the radiation direction and fed with 90-degree phase shift a Huygens antenna is formed. An alternative way to create the Huygens antenna is to combine two CP dipole antennas mentioned previously so that each axis of the second antenna are rotated by 90 degrees and the antennas are fed with 90-degree phase shift. Huygens antennas have usually about the same maximum dimensions than electrically small helical antennas, but the maximum directivity is double, or 3 dB more.

DESCRIPTION OF THE RELATED ART

Patent application CN109378577 A discloses a miniaturized broadband crossed dipole antenna with a radiation unit, metal ground and two dielectric substrates. Two dipole arms of the radiation unit are arranged at 90 degrees through an annular phase shifter.

Utility model CN206040960 U discloses a Huygens source antenna with upper medium baseplate with electric dipole antenna and a lower floor base plate with a magnetic dipole. Outer ends of the electric dipole are bent to form a S-shape and a Z-shape.

Patent application US2004090371 AA discloses a circular polarized antenna with four antenna elements in semi-spiral formation placed on dielectric material.

Patent application US2002126049 AA discloses an antenna element with two separate quarter-wave radiation elements formed on surface of a dielectric substrate.

SUMMARY

An object is to provide a method and apparatus so as to solve the problem of providing a small circularly polarized antenna suitable to be integrated with electronic parts in order to create compact devices, for example BLE DF tags or IoT devices.

The preferred embodiments of the invention are disclosed in the dependent claims.

The present invention is based on the idea of forming the antenna as a first "S" shape top element conductor on a finite base conductor with end contacts of the "S" shape top element, each connected to one of the finite base conductor, referred to as a base plate, and an antenna feed. Terms feed and antenna feed refer to a point or points used for coupling the antenna to an RF circuitry. The feed(s)/antenna feed(s) may be used for feeding the antenna from an RF circuitry when the antenna is used for transmission, as well as for feeding an RF signal received by the antenna to an RF circuitry when the antenna is used for reception. The end contacts may also be referred to as grounding contacts, when connected to the base conductor/base plate. The invention is further extended into a circularly polarized Huygens antenna having unidirectional radiation pattern by adding another "S" shape top element conductor rotated by 90 degrees to the first "S" shape top element respectively, and feeding the second top element with a 90-degree phase shift in comparison to the first top element.

Feeding the second top element with 90-degree phase shift allows the resulting unidirectional CP antenna to be placed very close to an underlying dielectric or conducting surface while maintaining its circularly polarized radiation pattern as the electromagnetic fields are almost completely absent below the antenna when the intended radiation direction is above the antenna.

According to a first aspect, a circularly polarized antenna is provided, that comprises a finite, conducting base plate defining a base plane, and an S-shaped top part defining a top plane parallel to the base plane. The top plane has a non-zero distance from the base plane. Both ends of the S-shaped top part have an end contact coupled either to the base plate or to an antenna feed. The antenna is configured to be fed single-ended or differentially to produce at least one pair of co-aligned electric and magnetic dipoles.

According to a second aspect, the at least one S-shaped top part is symmetrical such that the S-shaped top part can be divided at its midpoint to two half-portions of equal size and shape. The minimum distance of a reference point on the inner edge of each half-portion that is furthest away from an imaginary straight line between two ends of the S-shaped top part, when measured perpendicular from the imaginary straight line, is at least 20%, preferably at least 30% of length of the imaginary straight line between the two ends of the S-shaped top part.

According to a third aspect, the base plate is an essentially contiguous plate, and the area of the base plate is between 70% and 130%, preferably between 85% and 115%, most preferably about 115% of area of an imaginary finite top plate coplanar with the top plane. The imaginary finite top plate has the same basic shape with the base plate. The imaginary finite top plate comprises the top part and has a minimum area in which the top part fits.

According to a fourth aspect, volume between the top part and the base plate is filled with dielectric material.

According to a fifth aspect, volume between the top part and the base plate is filled with gas, such as air, or is a vacuum.

According to a sixth aspect, the antenna is a dipole antenna.

According to a seventh aspect, line width in a middle portion of each half-portion of the S-shaped dipole antenna that is furthest away from an imaginary straight line connecting the respective end and the midpoint of the S-shape is wider than line width in other portions of the S-shape.

According to an eighth aspect, the antenna is a circularly polarized Huygens antenna comprising a top part with two symmetrical S-shapes crossing each other perpendicularly at the midpoint of the two S-shapes.

The two symmetrical S-shapes are configured to be fed with 90-degree phase shift between the two S-shapes both for transmission and for reception.

According to a ninth aspect, the two S-shapes of the top part have mutually similar shape and the two S-shaped top parts are directly coupled to each other at the center of the top part.

According to a tenth aspect, the two S-shapes of the top part of the Huygens antenna have otherwise mutually similar shape, but the second S-shape comprises a central portion recessed on an intermediate layer within the dielectric material that is below the top plane but above the base plate, the central portion coupled with the rest of the second S-shape on the top layer by vias.

According to an eleventh aspect, the antenna with the volume between the top part and the base plate filled with gas, such as air, or is a vacuum, further comprises at least one support leg extending from each half-portion of the S-shaped top part at a location between a midpoint of the S-shaped top part and the respective end contact of the S-shaped top part. The at least one support leg provides mechanical support between the top part and the base plane but the at least one support leg is electrically disconnected from the base plate by a gap.

According to a twelfth aspect, the Huygens antenna is configured to be fed with a single feed, wherein the two S-parts have mutually different sizes, such that currents in the two S-shapes have a 90-degree phase shift with respect to each other and radiated powers from the two S-shapes are equal.

According to a thirteenth aspect, the antenna is constructed inside a dielectric shell.

The present invention advantageously provides a compact, electrically small antenna with a structure compatible with full radio system integration with related components, which is immune to rotation of antennas about the radio signal direction, is tolerant to odd number of reflections from obstacles and enables reliable space-to-Earth communication that is not degraded due to rotation of radio waves in Earth's ionosphere.

BRIEF DESCRIPTION OF THE DRAWINGS

In the following the invention will be described in greater detail, in connection with preferred embodiments, with reference to the attached drawings, in which.

DETAILED DESCRIPTION

In the following, terms "S-shape" and "S-shaped" refer to a symmetrical "S" or "Z"-like shape that connects two end points, wherein the S-shape may have common or mirrored orientation. The S-shape is symmetrical so that it can be divided at its midpoint to two halves of equal size and shape that extend to opposite directions from an imaginary straight line (100) connecting the two end points of the S-shape and traveling via its midpoint. Thus, the S-shape may be divided into two similar half-portions, each half-portion of the S-shape being between one of the end points and the midpoint. Minimum distance (b) of a reference point (c) on the inner edge of each half-portion that is furthest away from the imaginary straight line (100), when measured perpendicular from the imaginary straight line (100), is at least 20%, preferably at least 30% of the length (a) of the imaginary straight line (100) between the two end points of the S-shape. These dimensions are illustrated in the FIG. 10. The S-shape may comprise smooth curves, as well as angled and straight portions.

Figure 1:
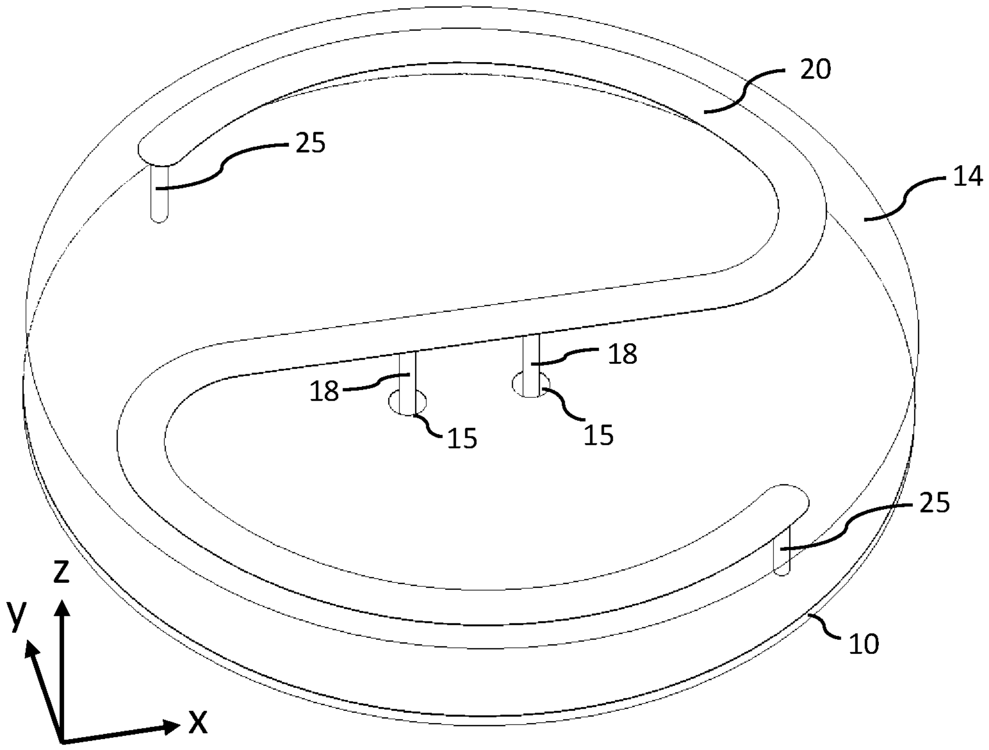
FIG. 1 illustrates structure of a circularly polarized dipole antenna.

The FIG. 1 illustrates structure of a right-hand circularly polarized dipole antenna according to a first embodiment of the invention. This antenna design has been primarily designed to be implemented using any suitable known printed circuitry board (PCB) technology. This design has circular polarization and a finite base plate (10) made of conductor material, preferably metal such as copper or aluminum. In this embodiment, the base plate (10) is circular, but any suitable shape may be applied, such as a polygon or an oval. The base plate (10) is essentially a contiguous plate forming a first horizontal plane (xy), referred to as a base plane, with an exception of one or more small openings for antenna feeds (18) towards the antenna through the base plate (10), as well as other small holes needed for component integration, packaging etc. that do not deteriorate currents in the base plate. In this example, antenna feeds are formed as vias through the dielectric (14). The base plate (10) forms a plane known as a ground plane for the antenna, but it is not necessarily grounded, in other words coupled to signal ground potential.

An S-shaped top part (20), also made from conductor material, is formed on a second plane, referred herein as the top plane, that is parallel to the base plane. The base plate (10) and the top plane comprising the top part (20) are separated by dielectric material (14). In other words, the dielectric material (14) is sandwiched between the base plate (10) and top part (20). In the configuration shown in the FIG. 1, the top part (20) is coupled (25) to the base plate (10) by end contacts (25) at or near its both ends. In the illustrated embodiment differential feeding is implemented, thus the antenna has two antenna feeds (18) near the geometrical center of the base plate (10), formed as vias extending through the dielectric material. However, single-ended feeding is also possible, in which case just a single antenna feed (18) is needed. The base plate (10) comprises one or two holes (15) that allow the respective antenna feed(s) (18) to be brought into contact with the S-shaped top part without directly coupling the antenna feed(s) (18) to the base plate (10). Alternatively, the antenna may be fed differentially from two ends contacts at or near ends of the S-shaped top part, or a single-ended feed can be implemented from one end contact at or near one end of the S-shape, while the other end is coupled to the base plate by the other end contact (25). When an end contact (25) is used for feeding the antenna, it is decoupled from the base plate (10). Alternatives for feeding schemes for CP antennas according to the invention will be further discussed below.

When the S-shaped top part (20) is fed from a single feed (single-ended) or two feeds (differential), a current mode is produced in the top part (20) that has a maximum in the center, two nulls at both sides of the center, and two maxima at the ends of the S-shaped top part (20). In this example, the S-shaped top part is coupled to the underlying base plate (10) by end contacts (25) at or near its two ends. This current mode is illustrated in the FIG. 2 with bold arrows on the S-shaped top part (20), where density of the arrows illustrates relative strength of the current in different parts of the top part. With this specific S-shape all x-directed current components in the S-shaped top part are in-phase in relation to current in the base plate (10) that is off-phase, illustrated with the bold arrows drawn on the base plate (10). This forms a total loop current that creates a magnetic dipole moment in the y-direction. In addition, there are y-directed current components where the S-shaped top part makes the sharp turns that do not have corresponding off-phase components in the base plate: this current component generates an electric dipole moment. Together, the electric and magnetic dipole moments create a right-handed CP dipole antenna with an omnidirectional radiation pattern with respect to the y-axis. The handedness of the radiation pattern is observed with the right-hand rule: when the electric dipole current component is along the thumb, the magnetic dipole current component circulates along the rest of the curled fingers. An S-shaped top part mirrored with respect to the yz-plane in comparison to that illustrated in the FIG. 1 would lead to left-handed CP antenna.

In addition to providing dielectric load, that affects the electrical characteristics of the antenna, the dielectric material (14) sandwiched between the base plate (10) and the S-shaped top part (20) serves as mechanical support of the antenna structure, in particular the top part (20) thereof. As shown in the drawings, the dielectric material may have equal area to that of the base plate (20). The antenna can also be constructed inside a dielectric shell (not shown) than can partially affect the characteristics of the antenna. This applies to all embodiments disclosed in this description.

Figure 2:
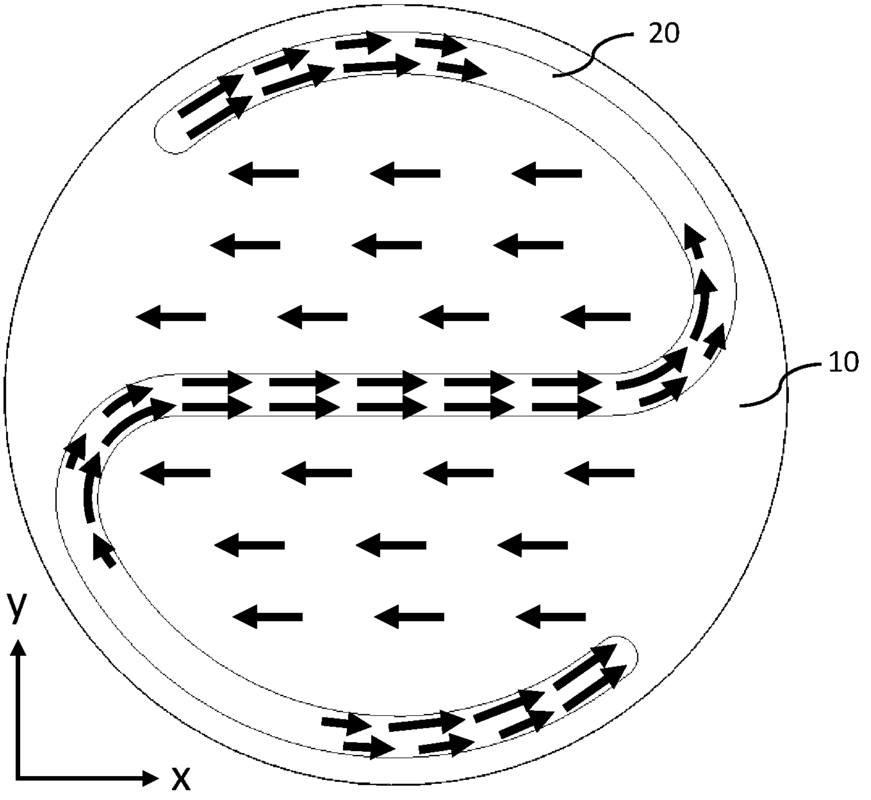
FIG. 2 illustrates electrical currents in the circularly polarized dipole antenna.
Figure 3A:
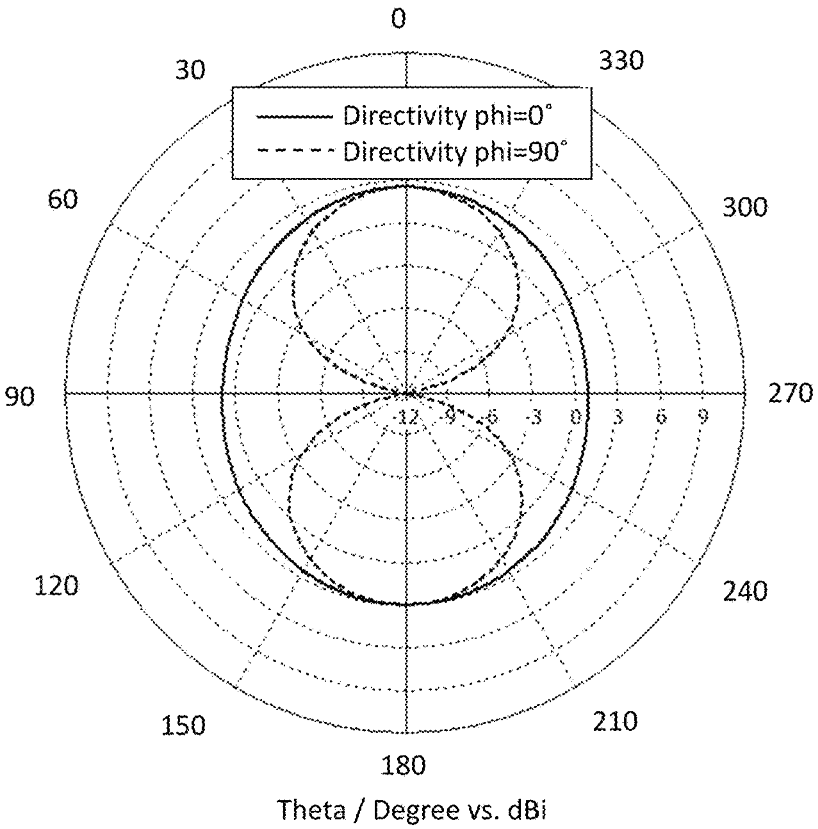
FIGS. 3*a* and 3*b* illustrate radiation pattern of the CP dipole antenna.
Figure 3B:
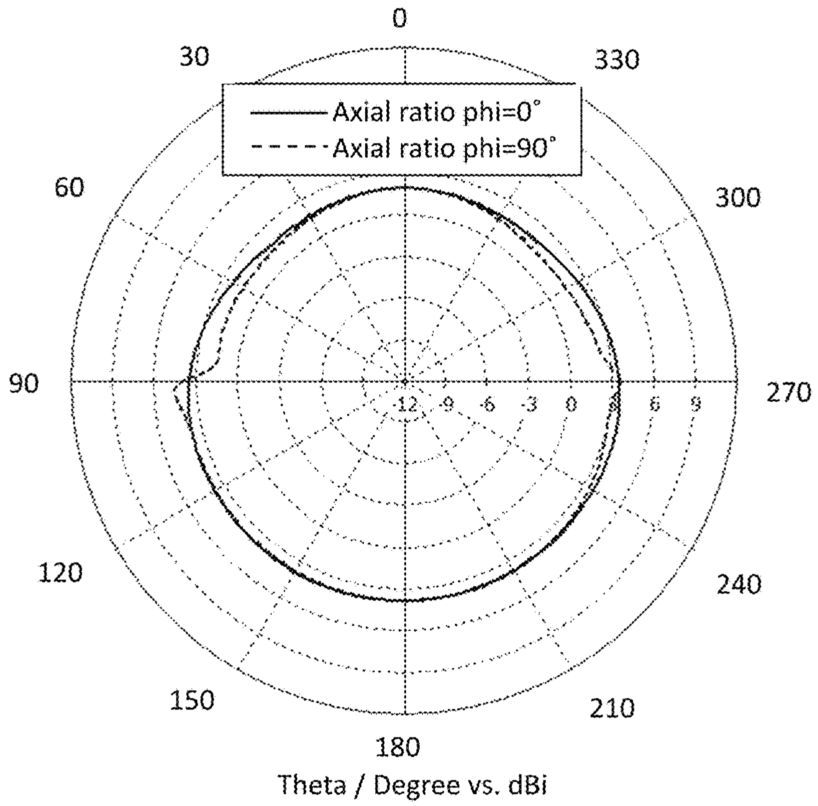

FIGS. 3_a_ and 3_b_ illustrate radiation pattern of the CP dipole antenna according to the first embodiment. FIG. 3_a_ illustrates directivity of the CP dipole antenna and FIG. 3_b_ illustrates axial ratio of the CP dipole antenna. Directivity of the antenna in the top direction (theta=0°) is about 3 dB. The axial ratio is considered circular in all directions where there is significant directivity. In literature, an antenna is considered as being circularly polarized, when its axial ratio is about 3 dB or less, despite of having slightly elliptic polarization vector. The handedness of the radiation of the CP dipole antenna of FIGS. 1 and 2 is right-handed (RH). Left-handed (LH) radiation is produced if the x-directed loop current has the opposite direction/phase, but the dipole current is still y-directed with the same phase. This can be done simply by mirroring the S-shaped top part (20), thus creating a standard oriented S-shaped pattern instead of the mirrored-S-shaped (or Z-shaped) top part shown in the FIGS. 1 and 2.

Even though the new CP dipole antenna radiates in the direction of the base plate, in other words down towards the negative z-axis, theta=180°, the near fields are shielded by the base plate (10). The integrated base plate (10) can be thus used as a ground plane for electronic components, battery, etc., without degrading the circular polarization of the antenna.

A Huygens antenna for linear polarization (LP) in its simplest form is two antennas: an electric dipole with a crossed magnetic dipole. However, such antenna cannot be easily made with a single wire contrary to a helical antenna because currents in the Huygens antenna must have a 90-degree phase difference.

The principle used in the CP dipole antenna according to the first embodiment may be further applied to generate a Huygens CP antenna by placing two CP dipole antennas rotated by 90-degrees with respect to each other and with respect to the radiation direction of the desired unidirectional pattern, and feeding these with a 90-degree phase difference for obtaining currents with 90-degree phase shift. The first S-shape provides an electric dipole for the first Huygens LP antenna and a magnetic dipole for the second Huygens LP antenna, and the second shape provides an electric dipole for the second Huygens LP antenna and a magnetic dipole for the first Huygens LP antenna. This combination forms a Huygens CP antenna.

Figure 4:
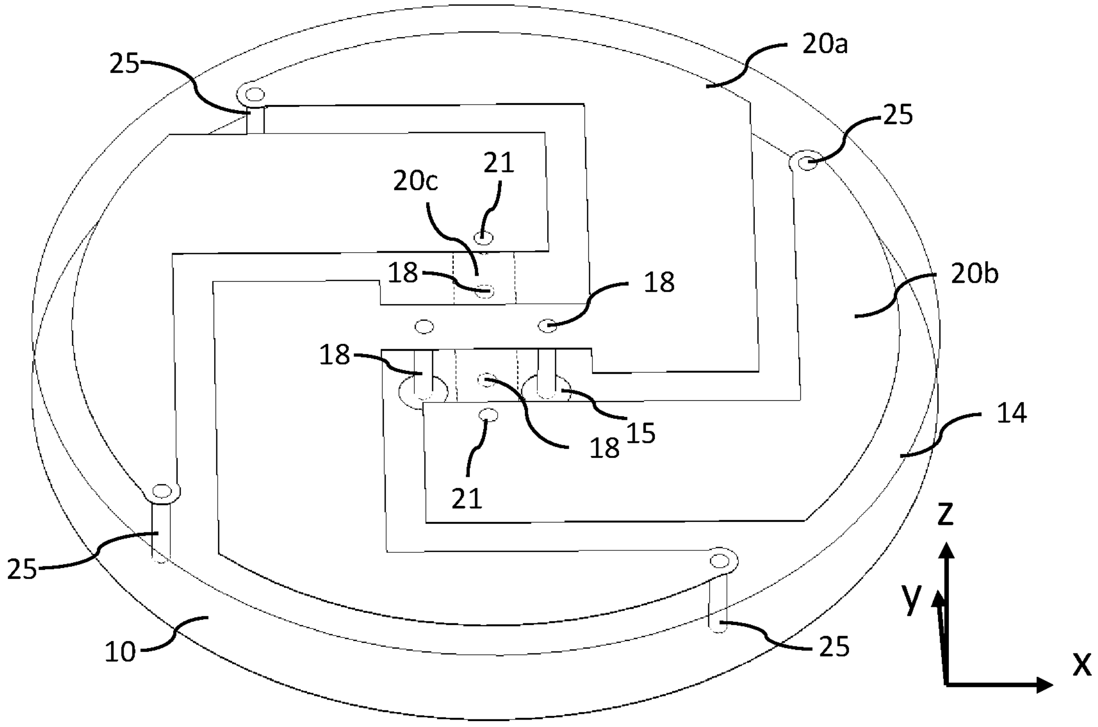
FIG. 4 Illustrates a first Huygens CP antenna.

The second embodiment is a Huygens CP antenna, which is illustrated in the FIG. 4. This antenna design has been primarily designed to be implemented using any suitable known printed circuitry board (PCB) technology. This antenna comprises two mutually almost similar S-shapes (20*a*, 20*b*) in the top part, rotated by 90 degrees with respect to each other and crossing each other at the center, thus forming a kind of swastika shape. As in the first embodiment, the S-shapes (20*a*, 20*b*) of the top part are formed into a top plane that is parallel to the base plane defined by the base plate (10). Like in the first embodiment each end of the S-shapes (20*a*, 20*b*) is coupled by end contacts (25) to the underlying finite base plate (10). The top layer, comprising majority of the top parts, is separated from the base plate (10) by dielectric material (14). Like the embodiment of FIG. 1, the dielectric material may have equal lateral area (in direction of the xy-plane) with the base plate (10), and its thickness may define the distance between the base plate (10) and the top part (20) in the top layer. End contacts may be formed as vias traveling through the dielectric material (14).

In this embodiment, the two S-shapes (20*a*, 20*b*) of the top part are electrically separated from each other. Electrical separation of the two S-shapes may be achieved for example as shown in the FIG. 4, by recessing a central portion (20*c*) of one of the S-shapes (20*b*) at an intermediate layer within the dielectric material that is below the top plane but above the base plate (10), and electrically coupling this central portion (20*c*) by vias (21) with the rest of the S-shape (20*b*) that is on the top layer. Mechanical structure of this Huygens CP antenna can be characterized as being equivalent to a combination of two CP dipole antennas according to the first embodiment.

Both S-shapes (20*a*, 20*b*) of the top part may be fed either differentially, as shown in the image 4, in which case each S-shape has two antenna feeds (18), or single-ended feeding may be used, in which case one antenna feed (18) per S-shape part is needed. In any case, the two S-shapes (20*a*, 20*b*) are to be fed with 90 degrees phase difference with respect to each other. Strokes at the center of the partly angular S-shaped top parts have been made narrower in order to achieve the desired impedance matching level by bringing the differential antenna feeds to a certain distance from each other.

Figure 5:
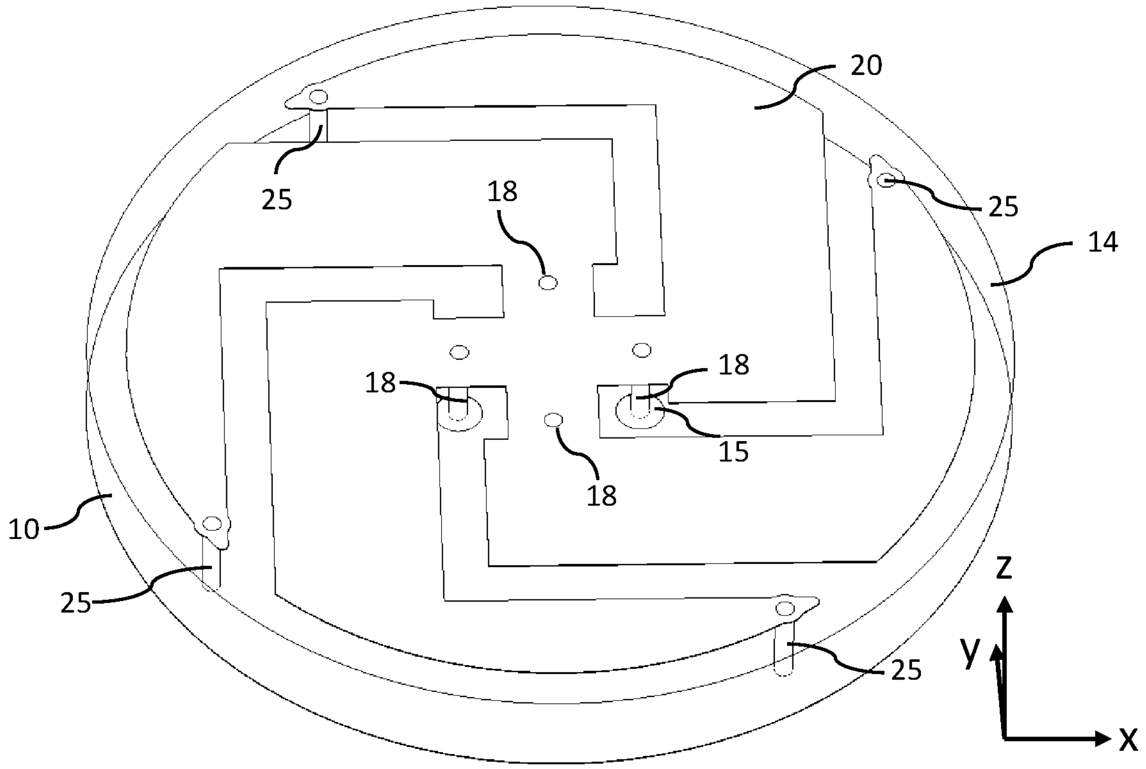
FIG. 5 Illustrates a second Huygens CP antenna.

A third embodiment is illustrated in the FIG. 5. This antenna design has also been primarily designed to be implemented using any suitable known printed circuitry board (PCB) technology. This embodiment differs from the second embodiment shown in the FIG. 4 in that the two S-shapes of the top part are now mutually joined in the center to form a single double-S- or swastika-shaped top part (20). Joining the separate S-shapes to form a single top part (20) improves symmetry of the antenna, which provides better axial ratio and a simpler mechanical structure in comparison to the second embodiment, since no intermediate layers and extra vias are required in the dielectric material (14), which have some effect on the current flowing in the S-shape. Although the S-shapes of the top part are electrically joined, they are to be fed with 90 degrees phase difference to each other.

Like the second embodiment, also this third embodiment may be considered to have a mechanical structure equivalent a combination of two top parts of the first embodiment, with the additional feature that the two S-shapes of the top part have been directly joined with each other at the center to form the single double S-shaped top part (20).

Figure 6A:
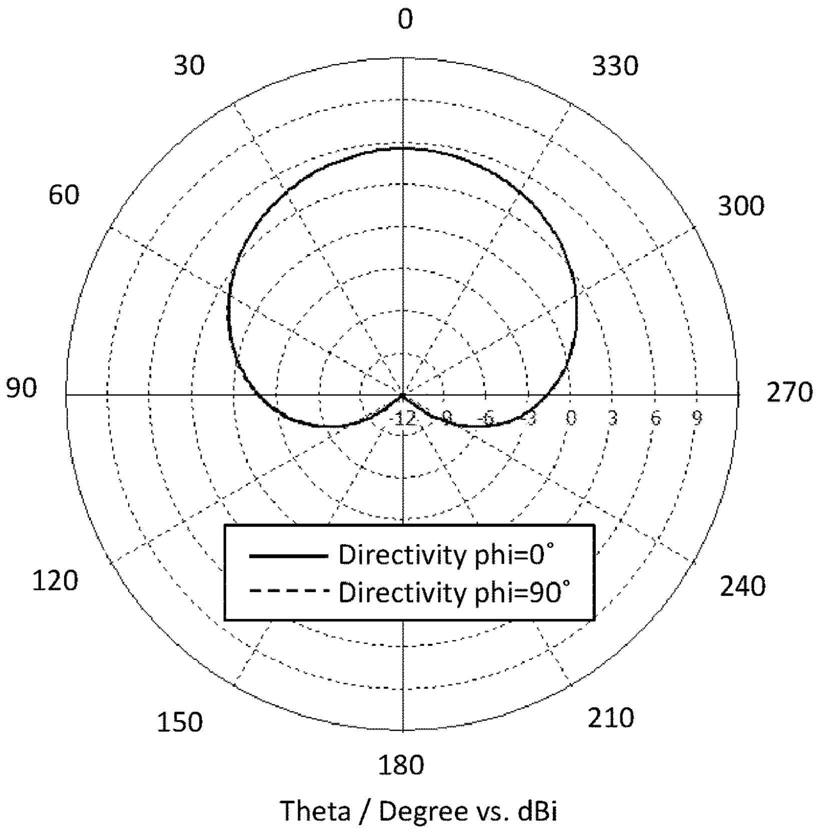
FIGS. 6*a* and 6*b* illustrate radiation pattern of the Huygens CP antenna
Figure 6B:
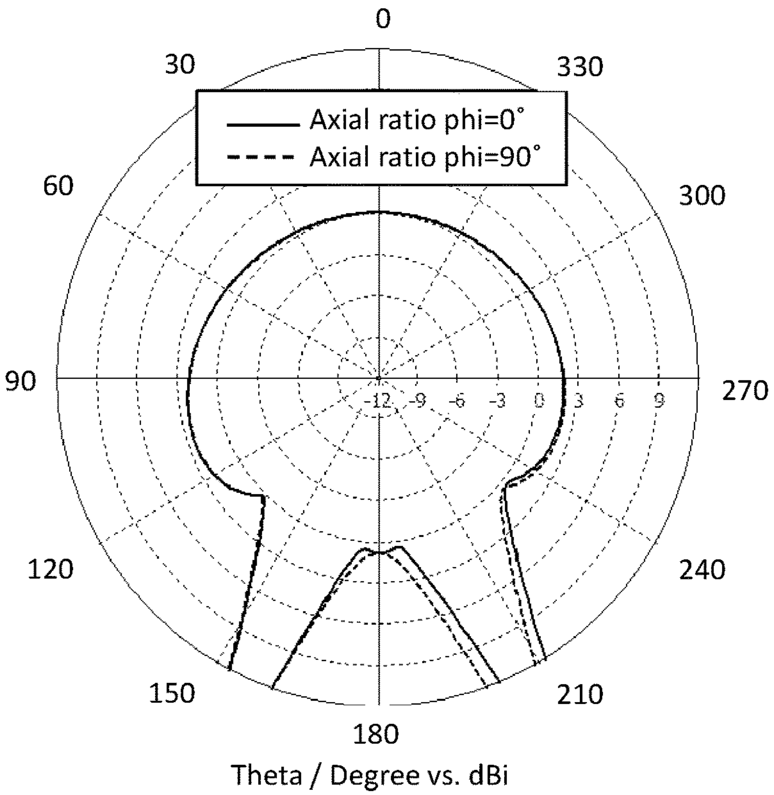

FIGS. 6*a* and 6*b* illustrate radiation pattern and axial ratio of the Huygens CP antenna according to the third embodiment. Directivity in the top direction (theta=0°) is almost 6 dB, which is about 3 dB more directivity in comparison to the directivity of the first embodiment and there is a single null in the radiation pattern in the opposite direction, i.e. downwards to direction of the negative z-axis. The near fields of the Huygens CP antenna are of similar magnitude on the other side of the base plate (10) as those of the CP dipole antenna. Thus, the base plate (10) may be used as ground plane for electronic components, battery, etc., without degrading the circular polarization of the antenna.

If an antenna is placed close to dielectric or conductive surfaces the polarization of the radiation pattern changes. This can happen if the antenna and integrated components are, e.g., a tag for Bluetooth low energy direction-finding (BLE DF) application. Even a dielectric surface with a thickness of a fraction of the wavelength affects the pattern's polarization. CP dipole's polarization changes from circular to elliptical in the vicinity of a dielectric surfaces, but a conductive surface in the vicinity of the antenna changes the radiation pattern to linear. This is expected from the image current theory: the radiated field is a sum of a right-handed or left-handed real current and the mirror image current that respectively has left-handed or right-handed polarization, the sum being always linear polarization.

However, in case of the new Huygens CP antenna, the image currents that are created in the conductive surface do not contribute in the direction where the Huygens pattern points, which is here the upward direction towards the positive z-axis, theta=0°. The base plate is closer to the conductive surface than the top part. In other words, when viewed from the top part, the conductive surface is located "behind the base plate". In the direction of the conducting surface (xy-plane, theta=90°), the radiated field is again the sum of the antenna's currents and the image currents, i.e., the polarization is linear. Thus, the Huygens CP antenna behaves better on a dielectric surface as well as on a conducting surface than a CP dipole antenna.

Figure 7:
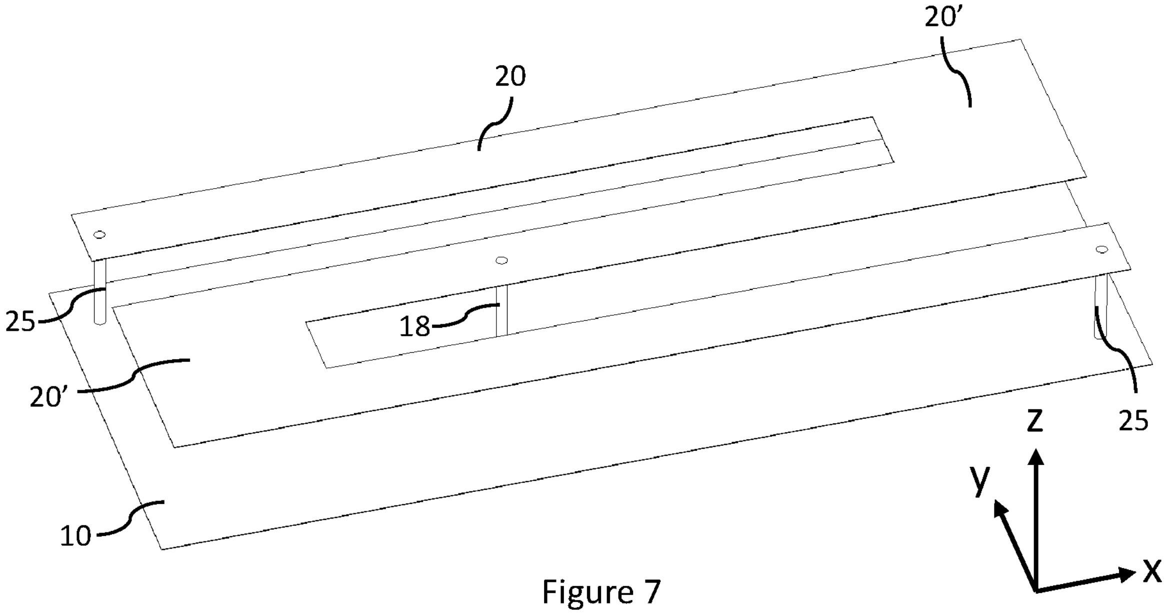
FIG. 7 illustrates a third CP dipole antenna

FIG. 7 illustrates a fourth embodiment of the invention. FIG. 7 shows a CP dipole antenna implemented without dielectric material between the base plate (10) and the top part (20). The top part (20) is coupled (25) to the base plate (10) by the end contacts at or near its both ends and, in this example, a single-ended antenna feed (18) is provided a little off-center of the top part (20) for achieving a desired impedance matching level. Middle part portions (20') of each half-portion of the S-shape, in which the nulls of the current mode are generated, have been made wider in comparison to rest of the S-shaped top portion (20) to compensate for the missing dielectric load due to absence of the dielectric. This embodiment is electrically somewhat larger than the basic CP dipole antenna.

Figure 8:
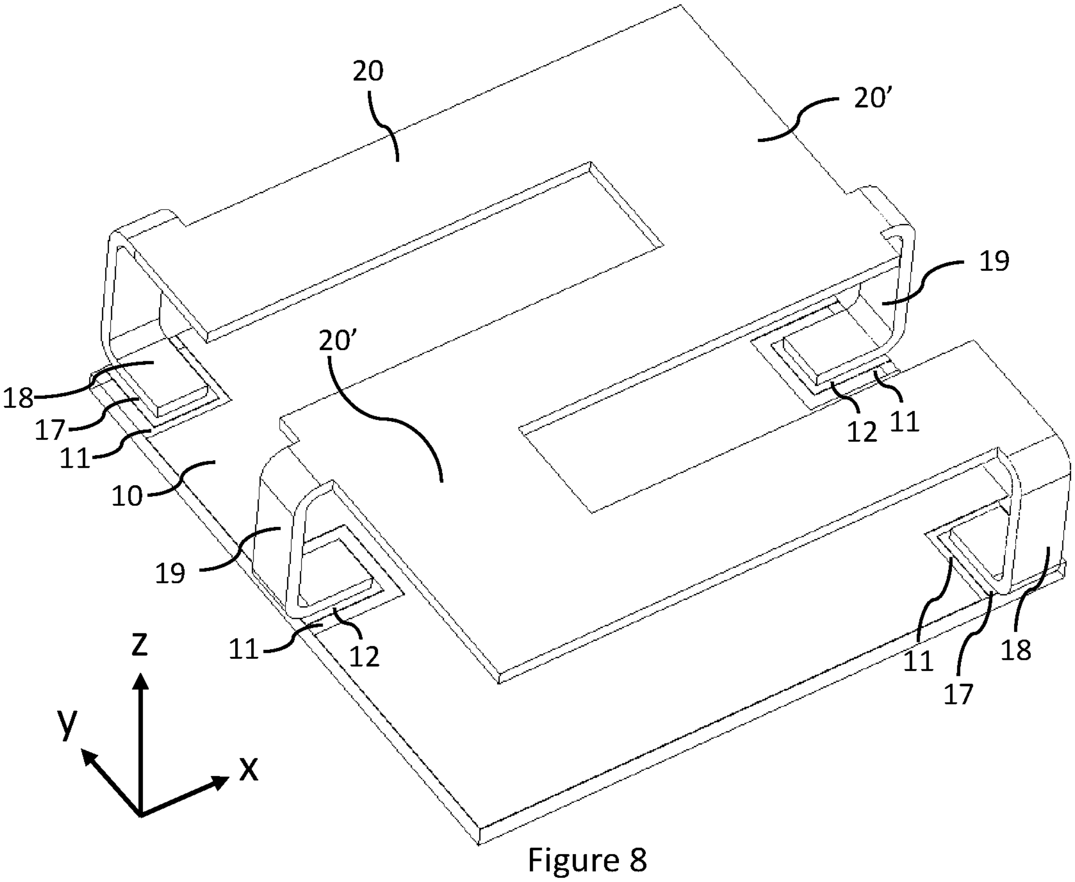
FIG. 8 illustrates a fourth CP dipole antenna

FIG. 8 illustrates a fifth embodiment of the invention, again with no dielectric layer between the base plate (10) and the top part (20). In this embodiment, the top part (20) of the CP dipole antenna is implemented as an angled S-shape with antenna feeds (18) implemented at the ends of the top part (20) as bent legs instead of vias used in the above embodiments, and there are further support legs (19) also bent from the top part (20), which support legs (19) are separated by gaps (11) from the base plate (10). Each of the support legs (19) may be coupled to a dummy pad (12) disposed on the base plane. A dummy pad (12) provides an area on the base plane to which the support leg (19) may be coupled for example by soldering, but such dummy pad (12) provides no further electrical connections and is separated from the base plate (10) by a gap (11) that disconnects the dummy pad (12) electrically from the base plate (10). In this example, the base plate (10) and the imaginary finite top plate including the top part (20) has rectangular shape, which makes this design particularly suitable for mass manufacturing and a particularly simple mechanical structure, where the top part (20), antenna feeds (18) and support legs (19) can all be formed by cutting a single metal sheet in wanted shape and bending the antenna feeds (18) and support legs (19) to form legs for mechanically supporting the top part (20) on the wanted top plane above the base plate (10). In this example, feeding is preferably implemented differentially from two antenna feeds (18) located at the two opposite ends of the S-shaped top part (20), but the feeding may alternatively be single-ended, in which case only one end of the S-shape is an antenna feed (18) while the other end of the top part (20) serves as an end contact coupled to the base plate (10). When feeding is performed at one end point or two end points of the S-shape (20), the antenna feed(s) (18) and thus also the respective ends of the S-shaped top part (20) are not coupled to the base plate (10), but a feed pad (17) may be provided onto which the antenna feed (18) may be coupled for example by soldering. Each feed pad (17) provides further coupling towards a radio frequency (RF) circuitry for feeding an RF signal to the antenna and/or for forwarding RF signals received by the antenna to the RF circuitry.

Support legs (19), which are not directly connected to the base plate (10), nor used as antenna feeds, provide both capacitive loading that is needed for compensating lack of dielectric load due to absence of the dielectric layer between the base plate (10) and the top part (20), and additional mechanical support for the CP dipole antenna's top part (20). Additional mechanical support is beneficial, since there is no dielectric material between the top part (20) and the base plate (10) to provide mechanical support for the structure, and specifically the top part (20) thereof. Thus, the support legs (19) improve mechanical robustness of the antenna structure.

In this embodiment, the gaps (11) are formed by a plurality of notches on the outer edges of the base plate (20). Area of each of each notch is greater than area of the respective the dummy pad (12) or feed pad (17), which is collocated with the respective support leg (19) or antenna feed (18). However, area of the notches is preferably small in comparison to the area of the base plate (10), so that the base plate (10) can still be considered as an essentially contiguous plate. End contacts (25), if applicable, are preferably coupled directly to the base plate (20) for example by soldering. Each gap (11) between the base plate (10) and the respective the support leg (19) and/or the dummy pads (12) forms a capacitor that causes capacitive loading.

Figure 9:
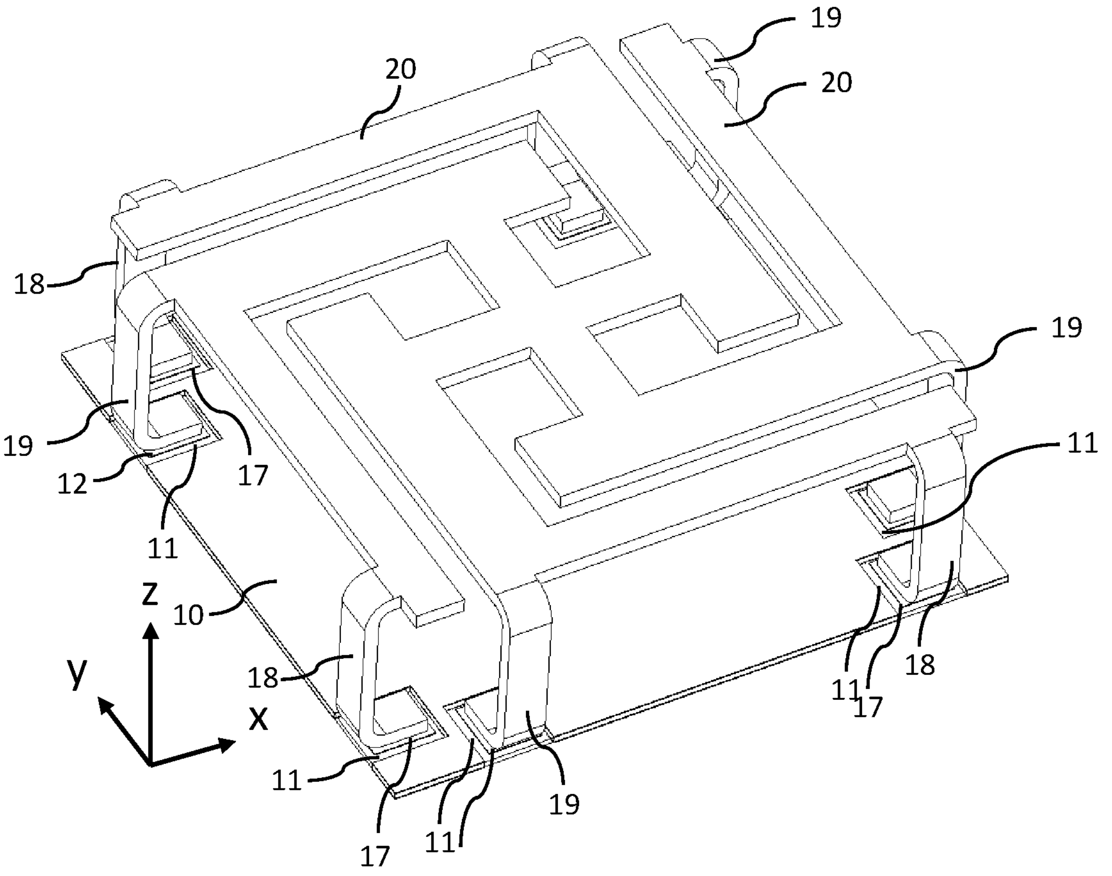
FIG. 9 illustrates a third Huygens CP antenna.

FIG. 9 illustrates a sixth embodiment of the invention, which utilizes the same structural construction principle with the fifth embodiment, but now applied to implement a Huygens CP antenna. The top part (20) of the Huygens CP antenna is formed, as explained above, by two mutually coupled S-shaped top parts, perpendicularly joined at the center of the S-shapes, in other words with 90° angle to each other. As in all above disclosed embodiments, the top part (20) is in the top plane that is parallel to the underlying base plate (10).

In this example, the joined S-shapes of the top part (20) of the Huygens CP antenna are both fed differentially from the respective antenna feeds (18) at or near the ends of each S-shaped top part (20), while support legs (19) with gaps (11) to the base plate (10) provide needed capacitive loading and additional mechanical support to the top part (20) similarly to those in the embodiment disclosed in relation to the FIG. 8. Antenna feeds (18), also formed as legs, are coupled to feed pads (17) and support legs (19) are coupled to dummy pads (12). Both the feed pads (17) and the dummy pads (12) are separated from the base plate (10) by gaps (11) defined by area of respective notches made on the outer edges of the base plate (10). Also the sixth embodiment is particularly suitable for mass production due to its simple and robust mechanical structure, where the top part (20) can be manufactured by cutting a sheet of conductive metal in correct form, bending the support legs (19), feeding points (18) and/or the end contacts, as included in the particular design, to the appropriate shape and coupling the bended metal sheet to an underlying structure comprising the base plate (10) that provides coupling area for possible end contacts when included in the design. The underlying structure also provides feed pads (17) for antenna feeds (18) and dummy pads (12) for the support legs (19). The underlying structure may be implemented for example as a PCB with metal base plate (10), feed pads (17) and dummy pads (12) provided on the top face.

The gaps (11) for decoupling the dummy pads (12) and the feed pads (17) from the base plate (10) may be characterized as notches on the outer edges of the base plate (10). These notches are collocated with the bent support legs (19) and antenna feed(s) (18) as needed for each particular design.

In the fifth and sixth embodiments, the base plate (10) may be manufactured using known printed circuit board (PCB) technology, wherein the base plate is a metal sheet, for example a copper sheet, on a top layer of the PCB, and the gaps (11) are formed on the top layer of the PCB between the base plate (10) and feed pads (17) and dummy pads (12). In such case, the gap can be considered to comprise, at least partially, dielectric material, for example some type of laminate commonly used for manufacturing PCB's, of one or more layers of the PCB below the gap (11).

Feeding the CP dipole and Huygens antennas according to the embodiments can be implemented using almost any known antenna feeding scheme. Probe feeds by vias or legs have been used in the embodiments, but a gap feed in the middle of the top part is a possible differential feed; a gap feed off-center is a single-ended feed; two gap feeds symmetrically off-center is a differential feed. Gap feed does not use the base plane as a reference. Transmission line(s) to gap feed point(s) can be, e.g., differential lines from another location.

A Huygens antenna can also be designed also to be fed with a single feed. This can be achieved by having two S-shapes of different size in order to have one shorter S-shape having a capacitive impedance and one longer S-shape having an inductive impedance in a way that currents in the two S-shapes have a 90-degree phase shift with respect to each other and their radiated powers are equal. Feeding can be realized by connecting the two S-shapes in parallel or by driving the antenna with a loop inside the structure.

End contacts, in other words the connections between the end(s) of the S-shape(s) top part and the base plate can be used as a feed point of a single-ended antenna feed or as feeding points for a differential antenna feed. In such case, an impedance matching network may be required as the impedance coupling may otherwise be over-coupled.

Performance and characteristics of different feeding schemes can be summarized as follows:

| CP antenna type | Differential feed at center | Single feed at center | Differential feed at end contact | Single feed at an end contact |
|---|---|---|---|---|
| CP dipole | good | good | good 1) | good 1) |
| CP Huygens (separate S:s) | good | useable 2) | good 1) | good 1) |
| CP Huygens (joined S:s) | good | useable 2) | good 1) | useable 3) |

1) refers to too much over-coupled impedance matching, which can be overcome by matching components,
2) refers to possible distortion of the radiation and axial rate pattern, which may be due to too much coupling of the feeds due to their proximity,
3) refers to need of matching components in the feed and in the end contact.

Figure 10:
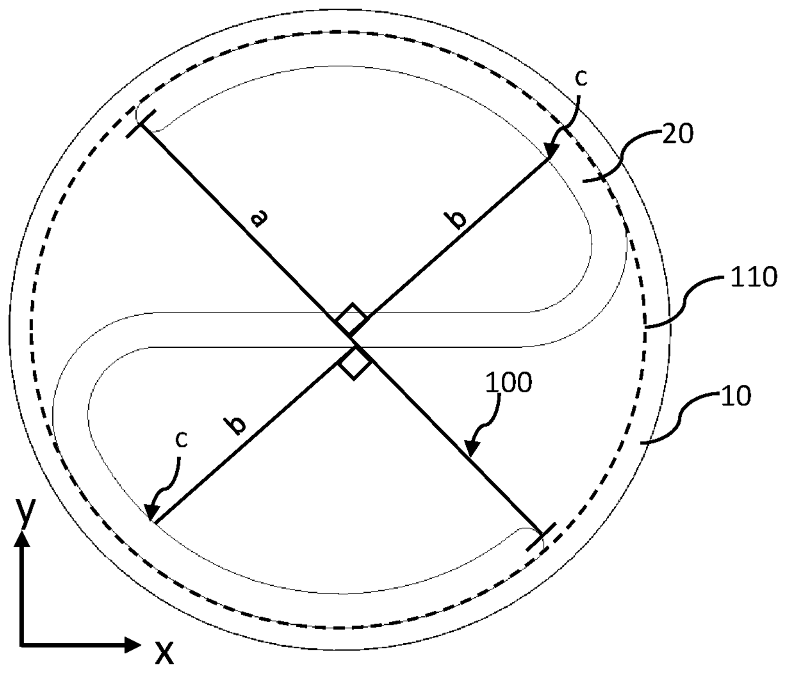
FIG. 10 illustrates measurement of certain relative dimensions of the antenna.

For defining appropriate, finite area of the base plate (10), an imaginary finite top plate (110) may be defined in the top plane, marked with a dashed line in the FIG. 10. The imaginary finite top plate (110) is parallel to the base plate (10) and it has a shape that is essentially equal to the basic shape of the base plate, for example a circle, an ellipse, a square, a quadrangle or any other polygon. Distance between the imaginary finite top plate (110) and the base plate (10) is non-zero. Outer edges of the imaginary finite top plate (110) are partly defined by the outer edges of the S-shape (20) so that the S-shape just fits within the basic shape of the imaginary finite top plate (110). For achieving the wanted result, area of the base plate (10) should be within +/−30%, preferably within +/−15% of the area of the imaginary finite top plate (110), in other words between 70% and 130%, or between 85% and 115% of the area of the imaginary finite top plate (110). In the above disclosed embodiments, area of the base plate (10) is about 15% greater than area of the respective imaginary finite top plate (110). For purpose of defining the basic shape of the base plate (10), holes and/or notches on the base plate are not considered, as long as their effect on the currents in the base plate is minor. For purpose of defining the area of the imaginary finite top plate, bent legs are not considered to be part of the imaginary finite top plate (110).

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A circularly polarized antenna comprising:

a finite, conducting base plate defining a base plane determining a horizontal plane, and a top element conductor, referred to as a top part, defining a top plane parallel to the base plane, wherein the top plane has a non-zero distance from the base plane, and wherein two ends of the top part have an end contact wherein:

the top part comprises at least one S-shaped top part, and each end contact of the S-shaped top part is coupled to one of the base plate and an antenna feed, and wherein the S-shaped top part is configured to be fed single-ended by a single antenna feed positioned off the geometrical center of the S-shaped top part or differentially by two antenna feeds positioned symmetrically off the geometrical center of the S-shaped top part to cause a current mode in the S-shaped top part that to produce a pair of co-aligned electric and magnetic dipoles in a direction parallel to the horizontal plane.

2. The circularly polarized antenna according to claim 1, wherein the S-shaped top part is symmetrical such that the S-shaped top part can be divided at its midpoint to two half-portions of equal size and shape, and wherein the minimum distance of a reference point on the inner edge of each half-portion that is furthest away from an imaginary straight line between two ends of the S-shaped top part, when measured perpendicular from the imaginary straight line, is at least 20%, preferably at least 30% of the length of the imaginary straight line between the two ends of the S-shaped top part.

3. The circularly polarized antenna according to claim 1, wherein the base plate is an essentially contiguous plate, and the area of the base plate is between 70% and 130%, preferably between 85% and 115%, most preferably about 115% of area of an imaginary finite top plate coplanar with the top plane, the imaginary finite top plate having the same basic shape with the base plate, comprising the top part, and having a minimum area in which the top part fits.

4. The circularly polarized antenna according to claim 1, wherein volume between the top part and the base plate is filled with dielectric material.

5. The circularly polarized antenna according to claim 1, wherein volume between the top part and the base plate is filled with gas, such as air, or a vacuum.

6. The circularly polarized antenna according to claim 5, wherein the antenna is a dipole antenna.

7. The circularly polarized antenna according to claim 6, wherein line width in a middle portion of each half-portion of the S-shaped top part that is furthest away from an imaginary straight line connecting the respective end and the midpoint of the S-shaped top part is wider than line width in other portions of the S-shaped top part.

8. The circularly polarized antenna according to claim 1, wherein the antenna is a circularly polarized Huygens antenna comprising a top part with two symmetrical S-shaped top parts crossing each other perpendicularly at the midpoint of the two S-shaped top parts, wherein the two symmetrical S-shaped top parts are configured to be fed with 90-degree phase shift between the two S-shaped top parts both for transmission and for reception.

9. The circularly polarized antenna according to claim 8, wherein the two S-shaped top parts have mutually similar shape and the two S-shaped top parts are directly coupled to each other at the center of the top part.

10. The circularly polarized antenna according to claim 8, wherein the two S-shaped top parts have mutually similar shape, except that the second S-shaped top part comprises a central portion recessed on an intermediate layer within the dielectric material that is below the top plane but above the base plate, the central portion coupled with the rest of the second S-shaped top part on the top layer by vias, to enable crossing of the two S-shaped top parts in the middle without being directly coupled to each other.

11. The circularly polarized antenna according to claim 8, wherein the antenna is configured to be fed by the single antenna feed, wherein the two S-shaped top parts have mutually different sizes, such that currents in the two S-shaped top parts have a 90-degree phase shift with respect to each other and radiated powers from the two S-shaped top parts are equal.

12. The circularly polarized antenna according to claim 1, wherein volume between the top part and the base plate is filled with gas, such as air, or a vacuum, wherein the antenna is a dipole antenna, and wherein the antenna further comprises at least one support leg extending from each half-portion of the S-shaped top part at a location between a midpoint of the S-shaped top part and the respective end contact of the S-shaped top part, wherein the at least one support leg provides mechanical support between the top part and the base plane but the at least one support leg is electrically disconnected from the base plate by a gap.

13. The circularly polarized antenna according to claim 1, wherein the antenna is constructed inside a dielectric shell.

* * * * *